United States Patent Office 3,063,294
Patented Nov. 13, 1962

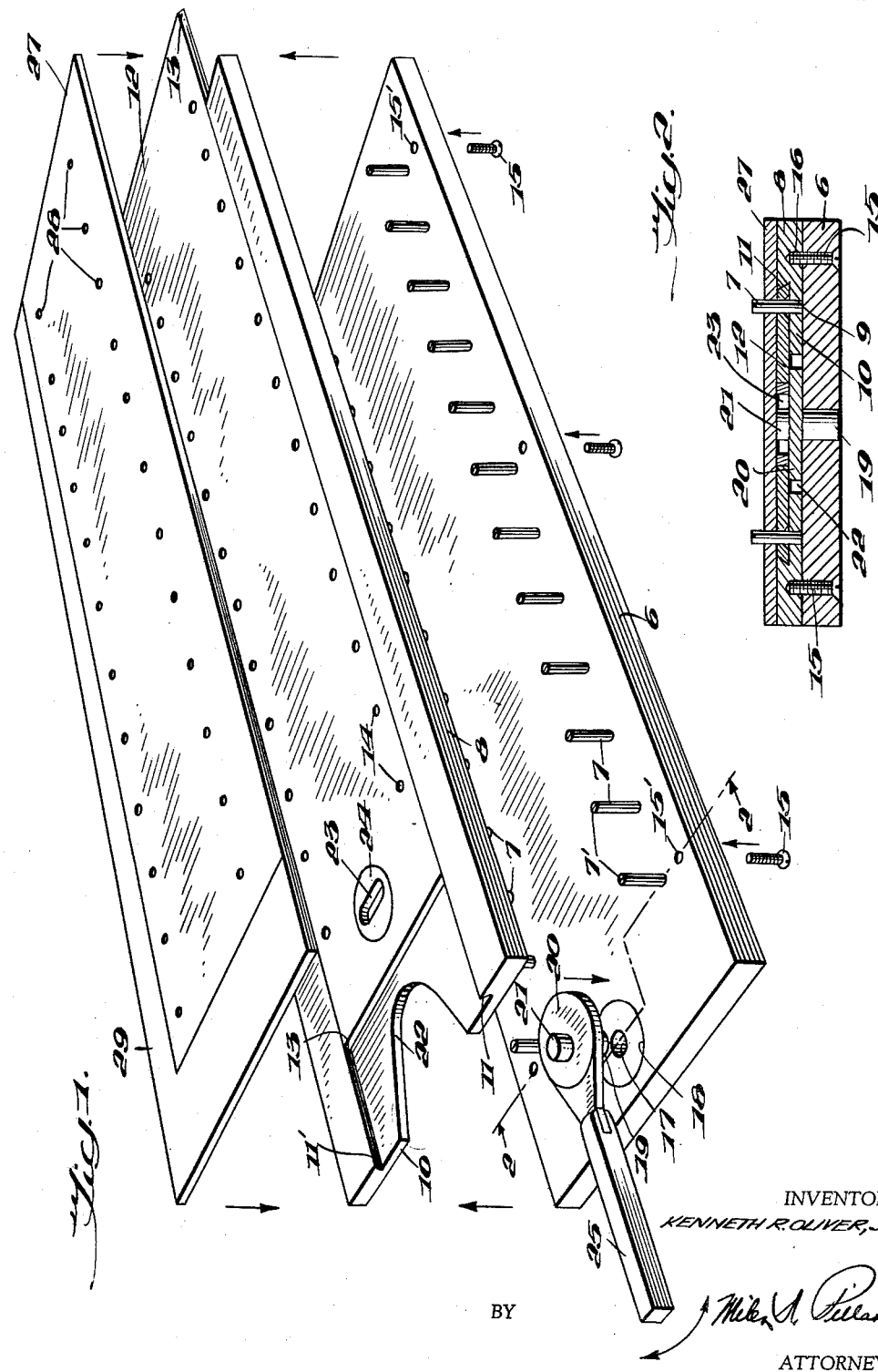

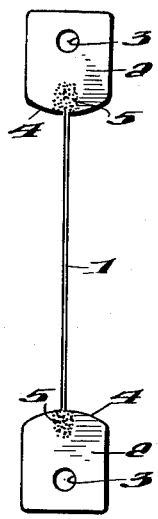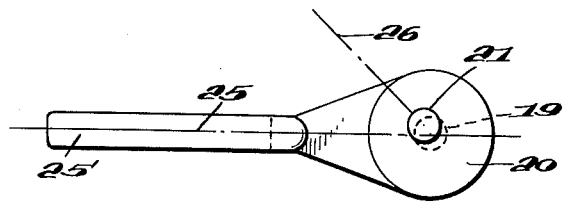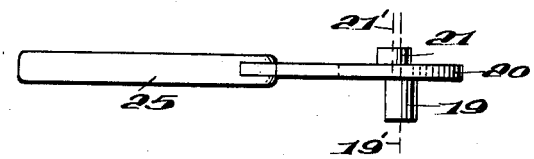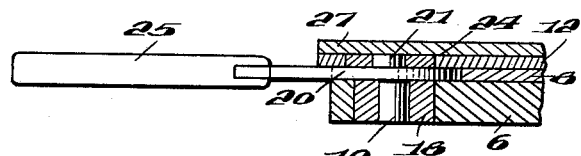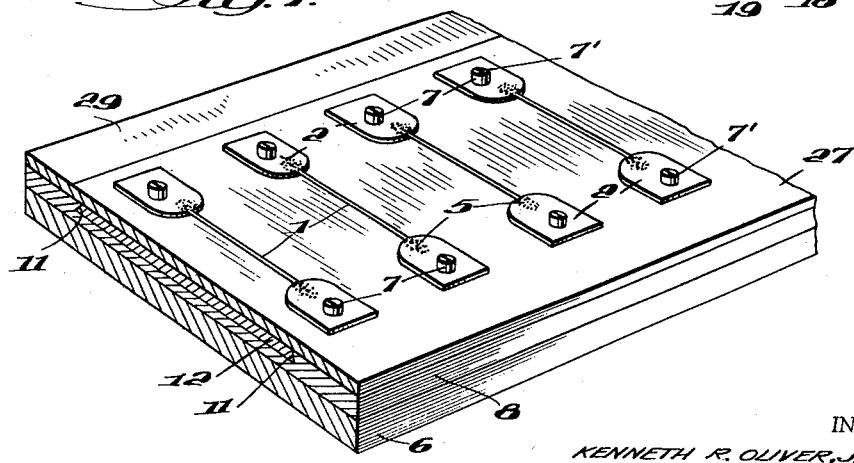

3,063,294
TEST SPECIMEN FILAMENT MOUNTING
Kenneth R. Oliver, Jr., 10 Pauline Circle,
Newport News, Va.
Filed Nov. 6, 1959, Ser. No. 851,336
12 Claims. (Cl. 73—160)

This invention relates to test specimen filament mountings and particularly to apparatus for preparing and mounting specimen filaments to facilitate the performance of various tests thereon.

The art of testing single filaments, such as fibers of various types, has always been a tedious and time-consuming operation primarily because of the difficulty in seeing and handling the filaments, which often are nearly invisible. Various arrangements have been proposed for clamping or otherwise holding the filaments for such test purposes, but such holding arrangements usually have been relatively complicated and have not provided the desired constant test length, so that repetitive tests could be performed and the results thereof readily compared. The present invention provides an arrangement for easily and rapidly mounting filaments so that they can be handled efficiently during test procedures. In addition, it provides an arrangement for mounting a number of test specimens so that these can be stored or assembled and a series of tests run on the specimens under substantially the same ambient conditions, so that a comparison of the results will provide more accurate information regarding the characteristics of the filaments.

According to the present invention, an improved test specimen filament mounting is provided by simply attaching a pair of tabs of suitable material, such as plastic, to each end of a fiber at a predetermined spacing between the tabs. For convenience in mounting the tabs on test equipment, each tab preferably is formed with an aperture therein which can easily be secured on a pin or hook on the test equipment. In order to assure a substantially constant length of test filament between the tabs, the mounting for the filament preferably is made on an improved apparatus with tabs having a particular configuration. This mounting apparatus includes a base plate with two rows of transversely aligned pairs of mounting pins which are longitudinally split transversely of the pins, and a simple clamping arrangement is provided whereby the slotted pins are compressed to a smaller diameter and a tab is arranged over each of the compressed pins, after which the compression on the pins is released. The aperture in the tabs forms a convenient means for assembling them on the mounting pins, and these apertures are, therefore, preferably formed smaller than the diameter of the uncompressed slotted pins and larger than the diameter of the pins when they are compressed. This aperture size provides for easily slipping the tabs over the pins when the pins are compressed and for firmly holding the tabs when the compression of the pins is released. Preferably, the tabs also are provided with an arcuate or curved edge formed on a radius having the same center of curvature as the apertures in the tabs. With such tabs, the curved edge of each tab is arranged facing inwardly towards the tab on the other pin of each transverse pair of pins on the base plate. A test filament then is secured to each pair of tabs by aligning the filament with the centers of the pins and adhesively securing the ends of the filament to each tab. The adhesive which secures the ends of the filaments to the tabs should extend to the outer edge of each respective curved edge of each tab. In this manner, the length of each test filament between the curved edges of the tabs is always the same value, even though the tabs may not be aligned exactly parallel on the mounting pins. Furthermore, since the center of curvature of the curved tabs edge is the same as the center in the aperture in each tab, the filament will always be subjected to tension along a straight line through the points at which the filament passes from the tabs and the centers of the apertures in the two tabs. This avoids the imposing of extraneous stresses on the filaments during tests which might result from kinking or pinching of the filaments by the mounting elements and provides for direct straight-line stressing of the test specimens.

An object of this invention is to provide an improved test specimen filament mounting.

Another object of this invention is to provide an improved and simplified test specimen filament mounting comprising an arrangement which eliminates extraneous stresses due to improper mounting.

A further object of this invention is to provide an improved test specimen filament mounting apparatus which enables an unskilled operator easily and rapidly to mount fibers uniformly on holding tabs and to assure a constant length for all specimens thus mounted.

Still another object of this invention is to provide an improved test specimen filament mounting which comprises an attachment for holding a filament for test purposes and also an apparatus for securing such an attachment to a test specimen.

Further objects and advantages of this invention will become apparent from the following description referring to the accompanying drawings, and the features of novelty which characterize this invention will be pointed out with particularity in the claims appended to and forming a part of this specification.

In the drawings:

FIG. 1 is an exploded perspective view of a test specimen filament mounting apparatus incorporating the present invention and illustrating the relative arrangement and functional relationship of the various parts of the apparatus;

FIG. 2 is a sectional view of an assembly of the apparatus shown in FIG. 1, taken along broken line 2—2;

FIG. 3 is a test specimen filament mounting, made in accordance with this invention, showing the configuration and arrangement of a pair of mounting tabs adhesively secured to the ends of a filament;

FIG. 4 is a plan view of the cam operating member used in the apparatus shown in FIG. 1;

FIG. 5 is a side elevational view of the cam member shown in FIG. 4 and more clearly illustrates the eccentric arrangement of the two pins on opposite sides of the cam base;

FIG. 6 is a side elevational view of the cam member in the mounting apparatus shown in FIG. 1, illustrating the cam member in relation to the cooperating parts of the apparatus; and FIG. 7 is a fragmentary perspective view, partly in section, of an assembly of the mounting apparatus shown in FIG. 1, illustrating several pairs of tabs and test specimen filaments mounted on the apparatus.

Referring to the drawings, an improved test specimen filament mounting incorporating this invention, in the form of an attachment for holding a filament for test purposes, is illustrated, completely assembled, in FIG. 3. In this embodiment, a test specimen of a suitable filament 1 is provided with improved test apparatus attachment means comprising a pair of similar tabs 2 secured to each end of the filament 1. Each of these tabs is formed with a mounting aperture 3 therein which is adapted to be placed over a mounting pin or hook on a testing machine, so as to secure the ends of the filament to operating parts of the testing machine.

For most filament tests, it is desirable that test specimens have a predetermined gauge length, so that the results of the tests may be readily compared. This is particularly true where the tests involve questions of elongation and recovery and determinations of the modulus of elasticity of specimens. In many instances, test specimens have natural kinks or curls, so that it is relatively difficult to obtain a standard length of filament between the points of attachment to a testing machine. It is highly desirable, therefore, to obtain a mounting for test filaments which will provide for a substantially uniform length of filament between the points of attachment to the testing machine whereby the effects of kinks and curls in the specimen are minimized. Care must be exercised in mounting a filament and attaching it to a test machine in order to avoid prestressing thereof.

In order to provide for mounting specimen filaments of substantially uniform predetermined gauge lengths free of prestressing, the tabs 2, which are secured to the ends of the filament 1, preferably are formed with substantially circular mounting apertures 3, and each tab is provided with a curved outer edge 4 which is formed on a radius having the same center of curvature as the center of the aperture 3. In the assembly of a pair of tabs these curved edges 4 are arranged so that they face each other, and the distance between the centers of curvature of these edges, that is, the centers of the mounting apertures 3, are spaced a fixed distance apart. The ends of the filament 1 are secured to the tabs 2 by any suitable adhesive 5, and the adhesive material extends to the outer edge of each curved edge 4 of each tab with the filament 1 drawn into alignment with the centers of the apertures 3 without placing any stress upon the filament 1.

Any suitable adhesive can be used for securing the filaments to the tabs 2, and, in practice, it has been found that the adhesive should not be too brittle when it dries, otherwise the fibers may break prematurely during testing; and also the adhesive must not be too soft, else it will tend to run when the fibers are subjected to testing, particularly during tensile tests. Since the centers of curvature of the edges 4 coincide with the centers of the apertures 3, it is immaterial if the tabs 2 are not exactly aligned or parallel to each other, as the distance from the edge of any point on a curved edge 4 of one tab to a point on the curved edge 4 of the other tab in line with the centers of the apertures 3 will always be the same, irrespective of the possible misalignment of the tabs. This provides for a simple and certain mounting of test filament specimens to a uniform gauge length, which does not require special skill in the mounting of the filaments on the attachment elements and produces a product which is easy to handle during tests and also requires very little skill in assuring test results which are readily comparable.

In order to provide the improved test specimen filament mounting shown in FIG. 3, an improved specimen mounting apparatus is utilized which facilitates the attachment of the mounting tabs 2 to specimen filaments and assures repetitive uniformity in the spacing between the mounting apertures 3 in the tabs. An embodiment of such improved apparatus comprises a base plate 6, on which two parallel rows of transversely aligned pairs of mounting pins 7 are secured. These mounting pins 7 extend outwardly perpendicular to the face of the base plate and the two rows of pins are spaced apart a distance equal to the predetermined desired gauge spacing of the apertures 3 in the specimen mounting tabs 2. These pins provide a convenient means on which a number of tabs may be placed and test specimen filaments may then be attached to the tabs, after which the assembled filaments and tabs can be removed from the pins 7 and suitably stored or kept for test purposes.

In order to assure that the curved edges 4 of each pair of mounting tabs will be secured to specimen filaments with the curved edges 4 facing each other, it is desirable that the tabs should be readily releasably secured to the mounting pins 7 during the process of securing specimen filaments to the tabs. This can conveniently be accomplished by forming each mounting pin 7 as an expansible element on which a tab is retained by friction in the desired position. Such pins preferably are formed of a suitable resilient spring material, such as a phosphor bronze, and are slotted transversely by a substantially diametrical slot 7' extending longitudinally thereof from the outer end of the pin at least to the point where the pin enters the base plate 6. This forms a mounting pin which is easily compressed to a smaller diameter by simply squeezing together the sides of the pins, and which resiliently returns to its initial diameter when the compressive force is released.

In order to facilitate assembling the tabs 2 on the pins 7 and frictionally to retain them thereon, the apertures 3 in the mounting tabs 2 preferably are formed on a diameter smaller than the uncompressed size of the mounting pins and larger than the size of the pins when they are compressed. In this manner, when a pin 7 is compressed, the diameter of the pin is smaller than the aperture 3 in a tab 2, and the tab will readily fit over such a compressed pin, and when the pressure on the pin is released, the tab will be secured in position on the pin due to the resilient expansion of the split pin.

In order to provide for the easy compression and release of the split pins 7 and to provide for assembling a number of test specimens by a simple operation of the mounting apparatus, provision is made for simultaneously compressing all of the pins on the base plate and holding these pins compressed while mounting tabs are assembled over each pin, after which the compression may be released so as to hold the tabs in position on the pins while test filaments are being secured to the tabs. This is accomplished by mounting the pins 7 in the base plate 6 with the slot 7' in each pin in transverse alignment with the slot in the other pin of each respective transverse pair of pins, and providing a camming compression assembly for simultaneously compressing all of the pins 7.

The camming compression assembly includes a guide plate 8 having a plurality of holes 9 therethrough corresponding to the number and arrangement of pins 7 in the base plate 6, and these holes are formed of a size to provide a close fit over the mounting pins, so that when the guide plate 8 is placed in position, with one face thereof in engagement with the face of the base plate from which the pins 7 extend, the holes 9 fit snugly around the pins 7. The guide plate 8 also is formed with a central longitudinally extending section 10 of reduced thickness which terminates at each side thereof in a guideway 11 formed by an outwardly tapered side 11'. A clamping plate 12, formed of a thickness exactly equal to the difference in thickness between the central section 10 and the two outer thicker portions of the guide plate 8 and having a width exactly equal to the width of the central section 10, is formed with outer sides 13 which taper outwardly at the same angle as the sides 11' of the guideways 11. In this manner, the clamping plate 12 can be longitudinally slidably fitted on the guide plate 8 and be retained in position thereon by the tapered guideways 11. This clamping plate 12 also is formed with a plurality of holes 14 therethrough in two parallel rows, which are arranged therein and are of such a size as to provide for ready alignment with the holes 9 through the guide plate 8. This provides for the easy assembly of the guide plate and clamping plate on the base plate 6, with the holes 9 and 14 therein closely fitted over the pins 7.

In order to provide for compressing the pins 7 with the guide and clamping plates arranged over the pins, the guide plate 8 is adapted to be rigidly secured to the base plate 6 in any suitable manner, as by a plurality of screws 15, which extend through holes 15' in the base plate 6 and threadedly engage complementary threaded sockets 16 in the guide plate 8. The pins 7 then can easily be compressed to a smaller diameter by slidably drawing the clamping plate in the guideways 11 longitudinally relative to the guide and base plates, so that the sides of the holes 14 in the clamping plate press one side of each mounting pin 7 towards the other side of each pin so as to close the slots 7' for effecting a reduction in the diameter of the pins.

This desired compressive action is obtained by providing a simple biasing cam structure which includes a socket 17 in an annular bearing element 18 mounted in one end of the base plate 6 for the reception of a pivot pin 19 secured to a base 20 of a cam operating member. This cam member is provided with a cam pin 21 extending from the other side of the base 20 from the pivot pin 19 and eccentric thereto. This eccentric relationship of the pivot and cam pins is more clearly shown in FIGS. 4, 5, and 6 and provides for the desired camming actuation of the clamping plate. The cam base 20 is substantially the same thickness as the reduced-thickness section 10 of the guide plate 8 and is readily rotatable relative to the guide plate 8 and the base plate 6 around the axis of the pivot pin 19 by being arranged in an open-ended recess 22 in the guide plate between the base plate 6 and the clamping plate 12 with the cam pin 21 extending into and operatively engaging the clamping plate in a cam follower recess 23 formed in an annular bearing member 24 mounted in an end of the clamping plate 12.

Operation of the cam member is facilitated by providing a handle 25 extending from the base 20 substantially perpendicular to the pivot and cam pins and with the axis 25' of the handle 25 in a plane substantially at 45° with a line 26 in a plane through the centers of the horizontal projection of the axes 19' and 21' of the pivot and cam pins, as shown in FIG. 4. The open-ended recess 22 in the guide plate 8 is formed so that when the clamping plate 12 is fully inserted in position in the guideways 11 of the guideplate 8 and these two plates are assembled over the pins 7, the cam assembly is rotated by the operating handle 25 in a counterclockwise direction, as viewed in FIG. 1, until the line 26 is through the centers of the pivot and cam pins is substantially in alignment with the longitudinal center line of the guide and clamping plates. This corresponds to the extreme counterclockwise position of the operating handle 25 in which the clamping plate 12 is moved longitudinally in the guideways 11 until the holes 14 in the clamping plate are in registry with the holes 9 in the guide plate, so that substantially no pressure is exerted on the pins 7 in this position of the cam assembly. This is the normal position of the cam assembly, guide plate, and clamping plate on the base plate.

In order to provide for the easy assembly and removal of filament mountings, it is desirable that the assembly of filaments and mounting tabs should be removable from the apparatus on which such filaments and tabs are assembled as soon as assemblies have been completed on all of the pins 7, so that another set of test specimens may be mounted. Since it takes a little time for the adhesive which secures the ends of the filaments to the tabs to set, it has been found expedient to provide a tray or mounting plate 27 provided with a plurality of holes 28, corresponding in number and arrangement to the two rows of mounting pins 7, so that this mounting plate may be fitted over the ends of the pins 7 with one of its faces in engagement with the outer faces of the guide and clamping plates 8 and 12, as shown in FIGS. 2, 6 and 7. With such an arrangement, the tabs 2 initially are placed in position over the compressed pins 7 and rest on the outer surface of the mounting plate 27. After a tab has been placed over each of the pins 7 with the curved edge 4 facing inwardly, the cam assembly operating handle 25 is turned clockwise, as viewed in FIG. 1, so as slidably to move the clamping plate 12 longitudinally in the guideways 11, thereby to release the compressive forces on the pins 7, permitting the two sides of the slotted pins to move resiliently outwardly against the edges of the apertures 3 securely to hold the tabs in position on the mounting plate 27.

One end of a filament 1 then is adhesively secured to the upper surface of one of the tabs 2, after which the filament is stretched, without imposing tension thereon, so that its ends extend substantially in alignment with the transversely extending slots 7' in the pins 7. The other end of the filament 1 then is adhesively secured to another tab 2, which is transversely aligned with the first tab. This procedure is followed until a filament has been secured to each transversely aligned pair of tabs on the mounting apparatus. The completely assembled specimen filaments and mounting tabs then are removed from the mounting apparatus and preferably are stored on a suitable rack or shelf to permit the adhesive which secures the filaments to the tabs to set or dry.

In order to facilitate removal of the assembled filaments and tabs, the cam assembly operating handle 25 is rotated in a counterclockwise direction, as viewed in FIG. 1, so as again to compress the mounting pins 7 by movement of the clamping plate 12, as previously described, which releases the clamping action of the resilient mounting pins 7 on the sides of the apertures 3 of the tabs 2. The mounting plate 27 then can readily be lifted off the pins 7 and the assembled filaments and tabs will remain on its upper surface substantially as assembled so that they conveniently can be transferred to the storage rack or shelf.

In most instances, it will be helpful if the mounting plate 27 is formed of a relatively dark material, such as a black plastic, as this facilitates handling of the filaments during their assembly and mounting on the tabs for the reason that most fiber filaments used in the manufacture of fabrics are very fine and in many cases are almost invisible. Many of these fibers also are transparent or a very light color, making it still more difficult to see the fibers as they are being handled. In addition, the mounting plate 27 preferably is provided with a white or light-colored border 29, so that specimen identifications can easily be made on the white surface of the border which can be readily removed after the specimens have been used for test purposes, and thus provides an arrangement which can repetitively be utilized for identifying the various specimens arranged on the mounting plate 27.

This filament mounting apparatus provides for conveniently and uniformly mounting specimen test filaments to a predetermined gauge length and provides a simple method for obtaining such specimen mountings which can be practiced without any particular skill. It also provides test specimen mountings of substantially uniform gauge length, so that the results of tests can be readily compared without the need of any extensive corrections because of a wide variety in the lengths of the test specimens.

While a particular embodiment of this invention has been illustrated and described, modifications thereof readily will occur to those skilled in the art. It is to be understood, therefore, that this invention is not to be limited to the particular details of the arrangement disclosed, and it is intended in the appended claims to cover all modifications within the spirit and scope of this invention.

I claim:

1. A test specimen filament mounting apparatus comprising a base plate; two rows of transversely aligned pairs of mounting pins extending outwardly from one face of said base plate, each mounting pin being formed of resilient material and with a substantially diametrical slot extending longitudinally thereof to the outer end of the pin and arranged substantially in transverse alignment with the slot in the other pin of each respective transverse pair of pins; means for compressing said pins to close said slots therein for effecting a reduction in diameter of said pins; a specimen filament mounting plate having a plurality of holes therethrough adapted to fit over said two rows of pins with the pins extending therefrom; filament holding tabs, each tab having an aperture therein smaller than the uncompressed size of said mounting pins and larger than the compressed size thereof to facilitate placing one of said tabs on each pin while compressed and for securely latching said tabs in position when said mounting pins are uncompressed; and adhesive securing to each tab an end of a filament aligned between centers of each pair of mounting pins, said adhesive extending to the edge of each tab facing its respective other associated tab.

2. A test specimen filament mounting comprising a base plate; two rows of transversely aligned pairs of mounting pins extending outwardly from one face of said base plate, each mounting pin being formed of resilient material and with a transverse slot extending longitudinally thereof to the outer end of the pin; means for compressing said pins for effecting a reduction in diameter thereof comprising a clamping plate having a plurality of holes therethrough which are arranged therein and are of such size as to fit closely over said mounting pins, means for longitudinally slidably retaining said clamping plate on said base plate with the holes in said clamping plate over said mounting pins with said pins extending outwardly therefrom, a cam member pivotally engaging said base plate and operatively engaging said clamping plate for shifting said clamping plate longitudinally relative to said base plate thereby slidably drawing said clamping plate longitudinally of said base plate so as to compress said slotted mounting pins to reduce the effective size thereof; filament holding tabs, each tab having an aperture therein smaller than the uncompressed size of said mounting pins and larger than the compressed size thereof to facilitate placing one of said tabs on each pin while compressed and for securely latching said tabs in position when said mounting pins are uncompressed; and adhesive securing to each tab an end of a filament aligned between centers of each pair of mounting pins, said adhesive extending to the edge of each tab facing its respective other associated tab.

3. A test specimen filament mounting comprising a base plate; two rows of transversely aligned pairs of mounting pins extending outwardly from one face of said base plate, each mounting pin being formed of resilient material and with a substantially diametrical slot extending longitudinally thereof to the outer end of the pin and arranged substantially in transverse alignment with the slot in the other pin of each respective transverse pair of pins; means for compressing said pins to close said slots therein for effecting a reduction in diameter of said pins comprising a guide plate having a plurality of holes therethrough which are arranged therein and are of such size as to fit closely over said mounting pins with said pins extending outwardly thereof when said guide plate is in position with one face thereof in engagement with the face of said base plate from which said pins extend, means for securing said guide plate in said position on said base plate, said guide plate having guideways extending longitudinally thereof, a clamping plate having a plurality of holes therethrough, substantially of the same size and arrangement as those in said guide plate, said clamping plate being longitudinally slidably retained on said guide plate by engagement with said guideways with the holes in said clamping plate in registry with the holes in said guide plate over said mounting pins with said pins extending outwardly therefrom, a cam member pivotally engaging said base plate and operatively engaging said clamping plate for shifting said clamping plate longitudinally relative to said base plate thereby slidably drawing said clamping plate longitudinally of said base plate so as to compress said slotted mounting pins to reduce the effective size thereof; filament holding tabs, each tab having an aperture therein smaller than the uncompressed size of said mounting pins and larger than the compressed size thereof to facilitate placing one of said tabs on each pin while compressed and for securely latching said tabs in position when said mounting pins are uncompressed; and adhesive securing to each tab an end of a filament aligned between centers of each pair of mounting pins.

4. A test specimen filament mounting comprising a base plate; two rows of transversely aligned pairs of mounting pins extending outwardly from one face of said base plate, each mounting pin being formed of resilient material and with a transverse slot extending longitudinally thereof to the outer end of the pin; means for compressing said pins for effecting a reduction in diameter thereof comprising a guide plate having a plurality of holes therethrough fitted over said mounting pins with said pins extending outwardly thereof when said guide plate is in position with one face thereof in engagement with the face of said base plate from which said pins extend, means for securing said guide plate in said position on said base plate, said guide plate haivng guideways extending longitudinally thereof, a clamping plate having a plurality of holes therethrough substantially of the same size and arrangement as those in said guide plate, said clamping plate being longitudinally slidably retained on said guide plate by engagement with said guideways with the holes in said clamping plate in registry with the holes in said guide plate over said mounting pins with said pins extending outwardly therefrom, said base plate having a socket at one end thereof facing said clamping plate, said clamping plate having a cam follower recess therein adapted to be aligned with said base plate socket when said holes in said clamping plate are coaxially aligned with said mounting pins, a cam member having a base and a pivot pin extending from one side thereof, a cam pin extending from the other side of said base from said pivot pin and being eccentric thereto, an operating handle extending from said base, said cam base being adapted to extend between said base plate and said clamping plate with said pivot pin seated in said socket and said cam pin extending into and engaging said clamping plate in said cam follower recess and with said handle extending outwardly of the assembly, said guide plate having a recess open to one end thereof for the reception of said cam base and of a size to allow for the turning of said cam operating handle for shifting said cam pin in said clamping plate cam follower recess whereby the axis thereof is shifted longitudinally relative to said base plate thereby slidably drawing said clamping plate in said guideways longitudinally of said guide and base plates so as to compress said slotted mounting pins to reduce the effective size thereof; a specimen filament mounting plate having a plurality of holes therethrough adapted to fit over said two rows of pins with the pins extending therefrom, said mounting plate haivng a two-tone surface comprising a black central portion and a white outer border; filament holding tabs, each tab having an aperture therein smaller than the uncompressed size of said mounting pins and larger than the compressed size thereof to facilitate placing one of said tabs on each pin while compressed and for securely latching said tabs in position when said mounting pins are uncompressed; and adhesive securing to each tab an end of a filament aligned between centers of each pair of mounting pins, said adhesive extending to the edge of each tab facing its respective other associated tab.

5. A test specimen filament mounting apparatus comprising a base plate; two rows of transversely aligned pairs of mounting pins extending outwardly from one face of said base plate, each mounting pin being formed of resilient material and with a transverse slot extending longitudinally thereof to the outer end of the pin; means for compressing said pins for effecting a reduction in diameter thereof comprising a clamping plate having a plurality of holes therethrough which are arranged therein and are of such size as to fit closely over said mounting pins, means for longitudinally slidably retaining said clamping plate on said base plate with the holes in said clamping plate over said mounting pins with said pins extending outwardly therefrom, said base plate having a socket at one end thereof facing said clamping plate, said clamping plate having a cam follower recess therein adapted to be aligned with said base plate socket when said holes in said clamping plate are coaxially aligned with said mounting pins, a cam member having a base and a pivot pin extending from one side thereof, a cam pin extending from the other side of said base from said pivot pin and being eccentric thereto, an operating handle extending from said base substantially perpendicular to said pivot and cam pins with the axis thereof in a plane substantially at 45° with a plane through the axes of said latter two pins, said cam base being adapted to extend between said base plate and said clamping plate with said pivot pin seated in said socket and said cam pin extending into and engaging said clamping plate in said cam follower recess and with said handle extending outwardly of the assembly to provide for the turning of said cam operating handle from one side to the other for shifting said cam pin in said clamping plate cam follower recess whereby the axis thereof is shifted longitudinally relative to said base plate thereby slidably drawing said clamping plate longitudinally of said base plate so as to compress said slotted mounting pins to reduce the effective size thereof; a specimen filament mounting plate having a plurality of holes therethrough adapted to fit over said two rows of pins with the pins extending therefrom and adapted to be arranged with a face thereof in engagement with said clamping plate; filament holding tabs, each tab having an aperture therein smaller than the uncompressed size of said mounting pins and larger than the compressed size thereof to facilitate placing one of said tabs on each pin while compressed and for securely latching said tabs in position when said mounting pins are uncompressed; and adhesive securing to each tab an end of a filament aligned between centers of each pair of mounting pins, said adhesive extending to the edge of each tab facing its respective other associated tab.

6. A test specimen filament mounting apparatus comprising a base plate; two rows of transversely aligned pairs of mounting pins extending outwardly from one face of said base plate, each mounting pin being formed of resilient material and with a substantially diametrical slot extending longitudinally thereof to the outer end of the pin and arranged substantially in transverse alignment with the slot in the other pin of each respective transverse pair of pins; means for compressing said pins to close said slots therein for effecting a reduction in diameter of said pins comprising a clamping plate having a plurality of holes therethrough which are arranged therein and are of such size as to fit closely over said mounting pins, means for longitudinally slidably retaining said clamping plate on said base plate with the holes in said clamping plate over said mounting pins with said pins extending outwardly therefrom, said base plate having a socket at one end thereof facing said clamping plate, said clamping plate having a cam follower recess therein adapted to be aligned with said base plate socket when said holes in said clamping plate are coaxially aligned with said mounting pins, a cam member having a base and a pivot pin extending from one side thereof, a cam pin extending from the other side of said base from said pivot pin and being eccentric thereto, an operating handle extending from said base, said cam base being adapted to extend between said base plate and said clamping plate with said pivot pin seated in said socket and said cam pin extending into and engaging said clamping plate in said cam follower recess and with said handle extending outwardly of the assembly whereby turning of said cam operating handle functions to shift said cam pin in said clamping plate cam follower recess so as to shift the axis thereof longitudinally relative to said base plate thereby slidably drawing said clamping plate longitudinally of said plate to compress said slotted mounting pins, a specimen filament mounting plate having a plurality of holes therethrough adapted to fit over said two rows of pins with the pins extending therefrom and adapted to be arranged with a face thereof in engagement with said clamping plate; filament holding tabs, each tab having an aperture therein smaller than the uncompressed size of said mounting pins and larger than the compressed size thereof to facilitate placing one of said tabs on each pin while compressed and for securely latching said tabs in position when said mounting pins are uncompressed, each tab having a curved outer edge formed on a radius having the same center of curvature as the center of said aperture and each of said tabs being arranged over one of said mounting pins with the curved edge of each tab facing inwardly toward the tab on the other pin of each pair; and adhesive securing to each tab an end of a filament alinged between centers of each pair of mounting pins, said adhesive extending to the edge of each respective curved edge of each tab.

7. A test specimen filament mounting apparatus comprising a base plate; two rows of transversely aligned pairs of mounting pins extending outwardly from one face of said base plate, each mounting pin being formed of resilient material and with a substantially diametrical slot extending longitudinally thereof to the outer end of the pin and arranged substantially in transverse alignment with the slot in the other pin of each respective transverse pair of pins; means for compressing said pins to close said slots therein for effecting a reduction in diameter of said pins comprising a clamping plate having a plurality of holes therethrough which are arranged therein and are of such size as to fit closely over said mounting pins, means for longitudinally slidably retaining said clamping plate on said base plate with the holes in said clamping plate over said mounting pins with said pins extending outwardly therefrom, said base plate having a socket at one end thereof facing said clamping plate, said clamping plate having a cam follower recess therein adapted to be aligned with said base plate socket when said holes in said clamping plate are coaxially aligned with said mounting pins, a cam member having a base and a pivot pin extending from one side thereof, a cam pin extending from the other side of said base from said pivot pin and being eccentric thereto, an operating handle extending from said base substantially perpendicular to said pivot and cam pins with the axis thereof in a plane substantially at 45° with a plane through the axes of said latter two pins, said cam base being adapted to extend between said base plate and said clamping plate with said pivot pin seated in said socket and said cam pin extending into and engaging said clamping plate in said cam follower recess and with said handle extending outwardly of the assembly, to provide for the turning of said cam operating handle for shifting said cam pin in said clamping plate cam follower recess whereby the axis thereof is shifted longitudinally relative to said base plate thereby slidably drawing said clamping plate longitudinally of said base plate so as to compress said slotted mounting pins to reduce the effective size thereof; a specimen filament mounting plate having a plurality of holes therethrough adapted to fit over said two rows of pins with the pins extending therefrom and adapted to be arranged with a face thereof in engagement with said clamping plate; filament holding tabs, each tab having an aperture therein smaller than the uncompressed size of said mounting pins and larger than the compressed size thereof to facilitate placing one of said tabs on each pin while compressed and for securely latching said tabs in position when said mounting pins are uncompressed, each tab having a curved outer edge formed on a radius having the same center of curvature as the center of said aperture and each of said tabs being arranged over one of said mounting pins with the curved edge of each tab facing inwardly toward the tab on the other pin of each pair; and adhesive securing to each tab an end of a filament aligned between centers of each pair of mounting pins, said adhesive extending to the outer edge of each respective curved edge of each tab.

8. Apparatus for preparing filament test specimens comprising a base plate; two rows of transversely aligned pairs of mounting pins extending outwardly from one face of said base plate, each mounting pin being formed of resilient material and with a substantially diametrical slot extending longitudinally thereof to the outer end of the pin and arranged substantially in transverse alignment with the slot in the other pin of each respective transverse pair of pins; means for compressing said pins to close said slots therein for effecting a reduction in diameter of said pins comprising a guide plate having a plurality of holes therethrough which are arranged therein and are of such size as to fit closely over said mounting pins with said pins extending outwardly thereof when said guide plate is in position with one face thereof in engagement with the face of said base plate from which said pins extend, means for securing said guide plate in said position on said base plate, said guide plate having guideways extending longitudinally thereof, a clamping plate having a plurality of holes therethrough substantially of the same size and arrangement as those in said guide plate, said clamping plate being longitudinally slidably retained on said guide plate by engagement with said guideways with the holes in said clamping plate in registry with the holes in said guide plate over said mounting pins with said pins extending outwardly therefrom, said base plate having a socket at one end thereof facing said clamping plate, said clamping plate having a cam follower recess therein adapted to be aligned with said base plate socket when said holes in said clamping plate are coaxially aligned with said mounting pins, a cam member having a base and a pivot pin extending from one side thereof, a cam pin extending from the other side of said base from said pivot pin and being eccentric thereto, an operating handle extending from said base substantially perpendicular to said pivot and cam pins with the axis thereof in a plane substantially at 45° with a plane through the axes of said latter two pins, said cam base being adapted to extend between said base plate and said clamping plate with said pivot pin seated in said socket and said cam pin extending into and engaging said clamping plate in said cam follower recess and with said handle extending outwardly of the assembly, said guide plate having a recess open to one end thereof for the reception of said cam base and of a size to allow for the turning of said cam operating handle from one side to the other for shifting said cam pin in said clamping plate cam follower recess whereby the axis thereof is shifted longitudinally relative to said base plate thereby slidably drawing said clamping plate in said guideways longitudinally of said guide and base plates so as to compress said slotted mounting pins to reduce the effective size thereof; a specimen filament mounting plate having a plurality of holes therethrough adapted to fit over said two rows of pins with the pins extending therefrom, said mounting plate having a two-tone surface comprising a black central portion and a white outer border; filament holding tabs, each tab having an aperture therein smaller than the uncompressed size of said mounting pins and larger than the compressed size thereof to facilitate placing one of said tabs on each pin while compressed and for securely latching said tabs in position when said mounting pins are uncompressed, each tab having a curved outer edge formed on a radius having the same center of curvature as the center of said aperture and each of said tabs being arranged over one of said mounting pins with the curved edge of each tab facing inwardly toward the tab on the other pin of each pair; and adhesive securing to each tab an end of a filament aligned between centers of each pair of mounting pins, said adhesive extending to the outer edge of each respective curved edge of each tab.

9. A test specimen filament mounting apparatus comprising a base plate; two rows of transversely aligned pairs of filament tab mounting elements extending outwardly from one face of said base plate, each mounting element being formed resiliently compressible, means for compressing said mounting elements for effecting a reduction in diameter thereof to a size such that a filament mounting tab having an aperture therein smaller than the uncompressed size of said pins can be readily fitted on each compressed pin and held in position thereon by release of the compression of said pins, and a specimen filament mounting plate having a plurality of holes therethrough adapted to fit over said two rows of mounting elements with said elements extending therefrom.

10. A test specimen filament mounting apparatus comprising a base plate; two rows of transversely aligned pairs of filament tab mounting pins extending outwardly from one face of said base plate, each mounting pin being formed of resilient material and with a substantially diametrical slot extending longitudinally thereof to the outer end of the pin and arranged substantially in transverse alignment with the slot in the other pin of each respective transverse pair of pins; means for compressing said pins to close said slots therein for effecting a reduction in diameter of said pins to a size such that a filament mounting tab having an aperture therein smaller than the uncompressed size of said pins can be readily fitted on each compressed pin and held in position thereon by release of the compression of said pins; and a specimen filament mounting plate having a plurality of holes therethrough adapted to fit over said two rows of pins with the pins extending therefrom.

11. A test specimen filament mounting comprising a base plate; two rows of transversely aligned pairs of mounting pins extending outwardly from one face of said base plate, each mounting pin being formed of resilient material and with a transverse slot extending longitudinally thereof to the outer end of the pin; means for compressing said pins for effecting a reduction in diameter thereof comprising a clamping plate having a plurality of holes therethrough which are arranged therein and are of such size as to fit closely over said mounting pins, means for longitudinally slidably retaining said clamping plate on said base plate with the holes in said clamping plate over said mounting pins with said pins extending outwardly therefrom, and a cam member pivotally engaging said base plate and operatively engaging said clamping plate for shifting said clamping plate longitudinally of said base plate so as to compress said slotted mounting pins to reduce the effective size thereof to a size such that a filament mounting tab having an aperture therein smaller than the uncompressed size of said pins can be readily fitted on each compressed pin and held in position thereon by release of the compression of said pins.

12. A test specimen filament mounting comprising a base plate; two rows of transversely aligned pairs of mounting pins extending outwardly from one face of said base plate, each mounting pin being formed of resilient material and with a substantially diametrical slot extending longitudinally thereof to the outer end of the pin and arranged substantially in transverse alignment with the slot in the other pin of each respective transverse pair of pins; means for compressing said pins to close said slots therein for effecting a reduction in diameter of said pins comprising a guide plate having a plurality of holes therethrough which are arranged therein and are of such size as to fit closely over said mounting pins with said pins extending outwardly thereof when said guide plate is in position with one face thereof in engagement with the face of said base plate from which said pins extend, means for securing said guide plate in said position on said base plate, said guide plate having guide ways extending longitudinally thereof, a clamping plate having a plurality of holes therethrough substantially of the same size and arrangement as those in said guide plate, said clamping plate being longitudinally slidably retained on said guide plate by engagement with said guideways with the holes in said clamping plate in registry with the holes in said guide plate over said mounting pins with said pins extending outwardly therefrom, and a cam member pivotally engaging said base plate and operatively engaging said clamping plate for shifting said clamping plate longitudinally relative to said base plate thereby slidably drawing said clamping plate longitudinally of said base plate so as to compress said slotted mounting pins to reduce the effective size thereof to a size such that a filament mounting tab having an aperture therein smaller than the uncompressed size of said pins can be readily fitted on each compressed pin and held in position thereon by release of the compression of said pins.

References Cited in the file of this patent
UNITED STATES PATENTS

| | | |
|---|---|---|
| 2,109,171 | Gould | Feb. 22, 1938 |
| 2,400,920 | Cummings | May 28, 1946 |
| 2,889,528 | Monfore | June 2, 1959 |

UNITED STATES PATENT OFFICE
CERTIFICATE OF CORRECTION

Patent No. 3,063,294                                     November 13, 1962

Kenneth R. Oliver, Jr.

It is hereby certified that error appears in the above numbered patent requiring correction and that the said Letters Patent should read as corrected below.

In the grant, lines 1 to 3, for "Kenneth R. Oliver, Jr., of Newport News, Virginia," read -- Kenneth R. Oliver, Jr., of Newport News, Virginia, assignor to The Dow Chemical Company, of Midland, Michigan, a corporation of Delaware, --; line 12, for "Kenneth R. Oliver, Jr., his heirs" read -- The Dow Chemical Company, its successors --; in the heading to the printed specification, lines 3 and 4, for "Kenneth R. Oliver, Jr., 10 Pauline Circle, Newport News, Va." read -- Kenneth R. Oliver, Jr., Newport News, Va., assignor to the Dow Chemical Company, Midland, Mich., a corporation of Delaware --.

Signed and sealed this 4th day of June 1963.

(SEAL)
Attest:
ERNEST W. SWIDER
Attesting Officer

DAVID L. LADD
Commissioner of Patents